(12) United States Patent
Malek

(10) Patent No.: US 7,921,317 B2
(45) Date of Patent: Apr. 5, 2011

(54) METHOD AND APPARATUS FOR SYNCHRONIZING CENTRAL PROCESSING UNITS IN A MULTIPROCESSOR APPARATUS

(75) Inventor: Robert Marion Malek, White Bear Lake Township, MN (US)

(73) Assignee: Unisys Corporation, Blue Bell, PA (US)

( * ) Notice: Subject to any disclaimer, the term of this patent is extended or adjusted under 35 U.S.C. 154(b) by 402 days.

(21) Appl. No.: 12/202,724

(22) Filed: Sep. 2, 2008

(65) Prior Publication Data

US 2010/0058095 A1  Mar. 4, 2010

(51) Int. Cl.
*G06F 1/12* (2006.01)
*G06F 15/16* (2006.01)

(52) U.S. Cl. .................................. 713/375; 713/401
(58) Field of Classification Search .................. 713/375
See application file for complete search history.

(56) References Cited

U.S. PATENT DOCUMENTS

| 6,052,700 | A | * | 4/2000 | Eckard et al. | 708/112 |
| 6,199,169 | B1 | * | 3/2001 | Voth | 713/400 |
| 6,223,228 | B1 | * | 4/2001 | Ryan et al. | 713/375 |
| 6,351,821 | B1 | * | 2/2002 | Voth | 713/600 |
| 6,480,966 | B1 | * | 11/2002 | Rawson, III | 713/400 |
| 7,337,344 | B2 | * | 2/2008 | Barman et al. | 713/400 |
| 2004/0187044 | A1 | * | 9/2004 | Barman et al. | 713/400 |

* cited by examiner

*Primary Examiner* — Ryan M Stiglic
(74) *Attorney, Agent, or Firm* — Robert P. Marley; Charles A. Johnson

(57) ABSTRACT

Updating timers of central processing units (CPUs) in a multiprocessor apparatus involves the repeated performance of update operations by a device that is coupled to the CPUs via a memory interface. The operations include selecting one of the plurality of CPUs and determining an offset value that estimates a delay time to process a timer update at the selected CPU. A corrected timer value of the selected CPU is determined based on the offset value and a reference time. The corrected timer value is written to a cache line of the selected CPU to cause the selected CPU to update the timer of the selected CPU.

19 Claims, 6 Drawing Sheets

METHOD AND APPARATUS FOR SYNCHRONIZING CENTRAL PROCESSING UNITS IN A MULTIPROCESSOR APPARATUS

FIELD OF THE INVENTION

The present invention relates in general to computer architectures, and more particularly, to synchronizing processor timers in multi-processor apparatus and systems with asynchronous clock sources.

BACKGROUND OF THE INVENTION

In transaction-type systems there are many times when there is a need to time stamp events to make sure they are processed in the order received for both normal operation and recovery. In a multiple-processor system, each processor may access its local counters (e.g., Intel™ Time Stamp Counter, TSC) to provide this time stamp, and to increase performance by not requiring external access to the system or some single shared resource.

Where there are many requests for such a timestamp, external access can cause degrade in overall performance. In a large system with many processors, it is possible that not all processors are on the same clock source. For example, this is possible if the system interconnect does not require a single clock source.

There are many advantages to this type of system interconnect design, but it may cause a problem if there is drift between the internal timers in the processors. This can become a fatal problem if the timer values appear to have time go backwards when comparing events from different processors. Synchronizing the processors using system software can be difficult and may also affect performance if the drift rate is large enough and the minimum time increment is small.

A solution to these and other problems in prior art computing systems is described hereinbelow.

SUMMARY OF THE INVENTION

The present invention is directed to a methods, apparatus, and systems for synchronizing central processing units in a multiprocessor apparatus or system. In one embodiment, a method involves repeatedly performing, by a processor synchronization device coupled to a plurality of central processing units (CPUs), update operations. The update operations include selecting one of the plurality of CPUs, determining a reference time and determining an offset value that estimates a delay time to process a counter update at the selected CPU. The update operations further include determining a corrected timer value of the selected CPU based on the offset value and the reference time, and writing the corrected timer value to a cache line of the selected CPU. The selected CPU is caused to update the timer of the selected CPU based on the corrected timer value written to the cache line.

In more particular embodiments, determining the offset value may involve reading the offset value from an offset table that is indexed by processor identifiers. In such a case, the method may further involve determining values of the offset table via a characterization test. The characterization test may involve causing the plurality of CPUs to write current counter values to the respective cache lines of the CPUs, and determining the values of the offset table by comparing the current counter values to the reference time.

In other more particular embodiments, the offset value may include a time required to write the corrected timer value to the cache line of the selected CPU and a CPU processing time to update the timer of the selected CPU. In other arrangements, causing the selected CPU to update the timer of the selected CPU may involve sending an interrupt to the selected processor. In such a case, an interrupt handler of the selected CPU causes the selected CPU to update the timer of the selected CPU based on the corrected timer value of the cache line.

In other more particular embodiments, the method may further involve determining update time intervals that are unique to each of the plurality of CPUs. In such a case, one of the plurality of CPUs is selected based on the update time interval associated with the selected CPU. In other arrangements, the method may further involve storing the corrected timer value in a register of the synchronization device. In this arrangement, the register modifies the corrected timer value to maintain correspondence with the reference time to account for delays in writing the corrected timer value to the cache line of the selected CPU.

In another embodiment, an apparatus includes a memory interface that is capable of communicating with a plurality of central processing units via at least one memory bus. The apparatus also includes an offset table having a plurality of offset values that each estimate a delay time to process a counter update at respective ones of the central processing units. The apparatus includes a master counter that determines a reference time and an update controller logic circuit coupled to the offset table and the master counter, The update controller performs update operations that include: 1) determining corrected timer values for the central processing units based on the reference time and the offset values; 2) writing, via the memory interface, the corrected timer values to cache lines of the respective central processing units; and 3) causing the central processing units to update their timers based on the corrected timer values written to the cache lines.

In more particular embodiments, the apparatus may further include a setup controller that performs setup operations that involve: causing the plurality of central processing units to write current counter values to the respective cache lines of the central processing units; and determining the values of the offset table by comparing the current counter values to the reference time. In another arrangement, the offset values may include times required to write the corrected timer value to the respective cache lines of the central processing units and central processing unit processing times to update the respective timers of the central processing units.

In other more particular embodiments, the apparatus may further include an interrupt/address table coupled to the update controller and the memory interface. The interrupt/address table includes addresses and associated interrupt vectors for each of the central processing units. In such a case, causing the central processing units to update their timers involves sending interrupts to the respective central processing units via the interrupt/address table. In response, interrupt handlers of the respective central processing units cause the respective central processing units to update their timers. In such an arrangement, the interrupt/address table and the offset table may be indexed by a processor identifier, and the update operations may be initiated by the update controller sending a processor select signal to the interrupt/address table and the offset table.

In other more particular embodiments, the update operations may further involve determining update time intervals unique to each of the plurality of central processing units, and wherein the one of the plurality of CPUs is selected based on the update time interval associated with the selected CPU. In some configurations, the memory interface may include a peripheral input-output interface and/or a front-side bus interface. In other configurations, the master counter may include an interface to an external reference time source. In such a case, the master counter is updated by the external reference time source.

In other more particular embodiments, the apparatus may further include an adder coupled to the master counter, the offset table, and the memory interface. The adder determines the corrected timer values by summing the reference time and the offset values. Also in this configuration, the adder writes the corrected timer values to the memory interface in response to the summing operation. This configuration may further include counter-type register that couples the adder to the memory interface. The counter type register causes the corrected timer values to maintain correspondence with the master counter to account for delays in writing the corrected timer values via the memory interface.

In another embodiment, an apparatus includes: a) means for interfacing with a plurality of central processing units; b) means for determining corrected timer values for each of the central processing units; c) means for writing the corrected timer values to cache lines of the respective central processing units; and d) means for causing the central processing units to update their timers based on the corrected timer values written to the cache lines.

In other more particular embodiments, the apparatus may also include means for causing the plurality of central processing units to write current counter values to the respective cache lines of the central processing units; and means for determining offset values of each of the central processing units based on the current counter values. Each of the offset values estimate a delay time to update counters of respective ones of the central processing units of a respective one of the central processing units. In other arrangements, the apparatus may include means for causing the corrected timer values to maintain correspondence with a master counter reference time before the corrected timer values are written to the cache lines to account for delays in writing the corrected timer values to the cache lines.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

DETAILED DESCRIPTION

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

The present invention is generally applicable to multiprocessing computing architectures, and in particular to synchronizing processor timing in architectures using multiple processors. In the past the problem was resolved by either requiring a single clock bus for all processors in the system. For very large systems the ability to distribute a single clock signal at the high frequencies of today's processors is very costly and has other disadvantages. A single counter source can create bottle necks in the system when large numbers of processors require access in large volumes. This creates a lot of external bus traffic and can cause increased variation in the access times due to conflicts.

Figure 1:
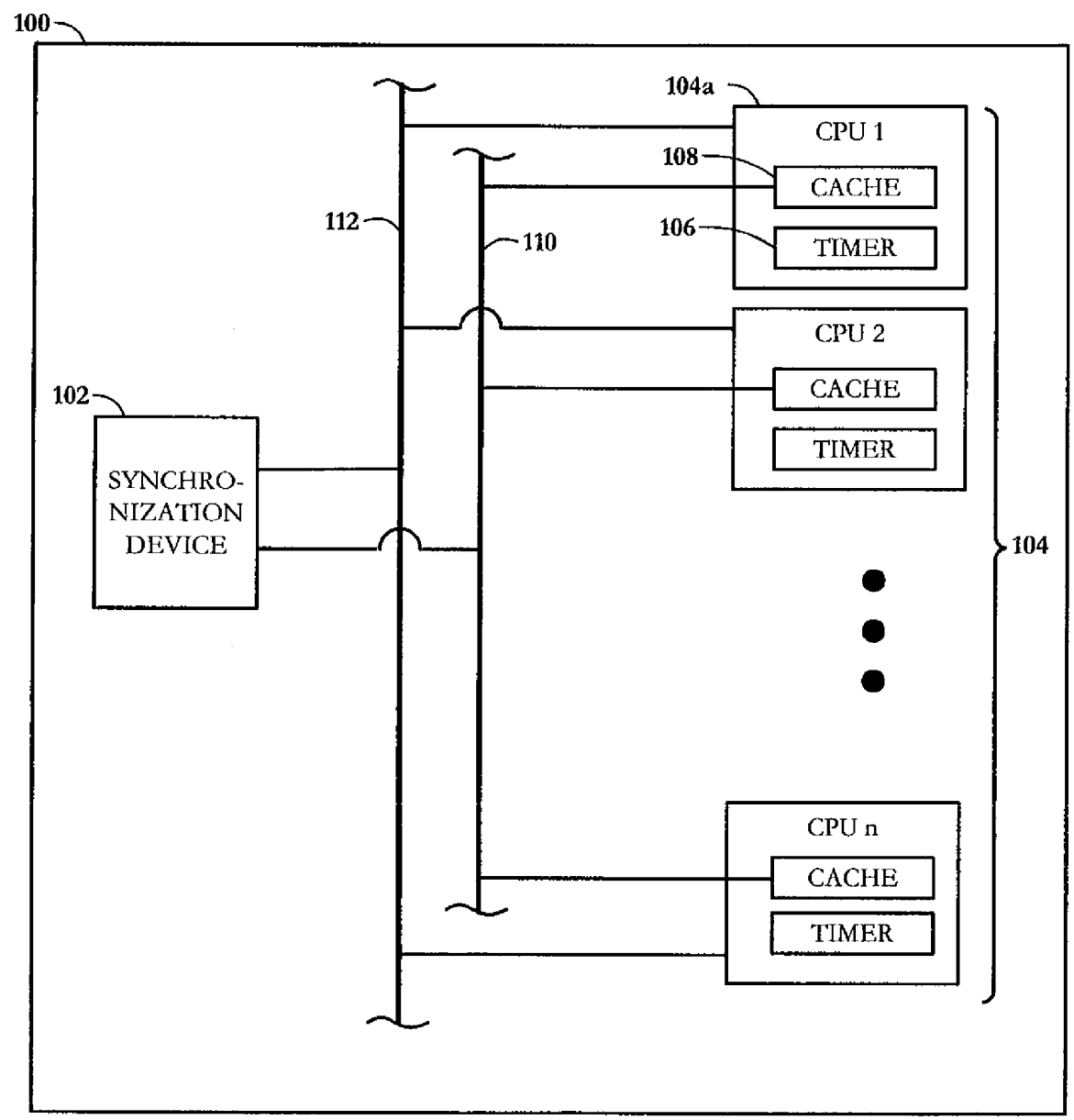
FIG. 1. is a block diagram illustrating a multiprocessor computing arrangement according to an embodiment of the invention.

In reference now to FIG. 1, block diagram illustrates a computing arrangement 100 having the ability to synchronize asynchronous processor clocks according to an embodiment of the invention. The arrangement 100 includes a synchronization device 102 coupled to a plurality of central processing units ($CPU_1$-CPUn) identified as processors 104a, 104b . . . 104n, each having an independent timer/counter (e.g., timer 106 of processor 104a). The device 102 is configured to update timers/counters by requesting that each processor 104a, 104b . . . 104n in the system to update its timer from a central source.

In the illustrated embodiment, the device 102 may communicate the updates to the processors via accessing a cache line (e.g., a line within cache 108 of processor 104a) to write an updated value. The device 102 may also read the cache lines to determine a current timer value so that an error/offset for each of the timers can be estimated. The read/writes to the caches may occur via a memory bus 110, such as a peripheral bus, system memory bus, and/or front side bus. The device 102 may cause the processors 104a, 104b . . . 104n to apply updates and/or provide counter readouts via signals (e.g., processor interrupts) sent via an input-output bus 112 or memory bus 110.

Processors 104a, 104b . . . 104n in a large system may have different response times from any single location such as a memory address or device 102. A device 102 that tries to synchronize the processors 104a, 104b . . . 104n will need to have adjustment values for each of the possible processors 104a, 104b . . . 104n. Processors 104a, 104b . . . 104n will also have different latency times to any memory address, but the local memory (e.g., L1 or L2 cache 108) near the selected processor will have the smallest variation in the access time. Also, because there may be no direct way to update the local processor timer register, there may be a need to interrupt the processor and cause it to fetch some number of instructions to process the interrupt, read the updated value, and load it into the timer registers.

There will be some variation in the latency to perform the above described actions, and any calculation of adjustment values based on processor update delay may be adjusted using estimates of latency. A one microsecond minimum time between any two counters in the system is possible.

Figure 2:
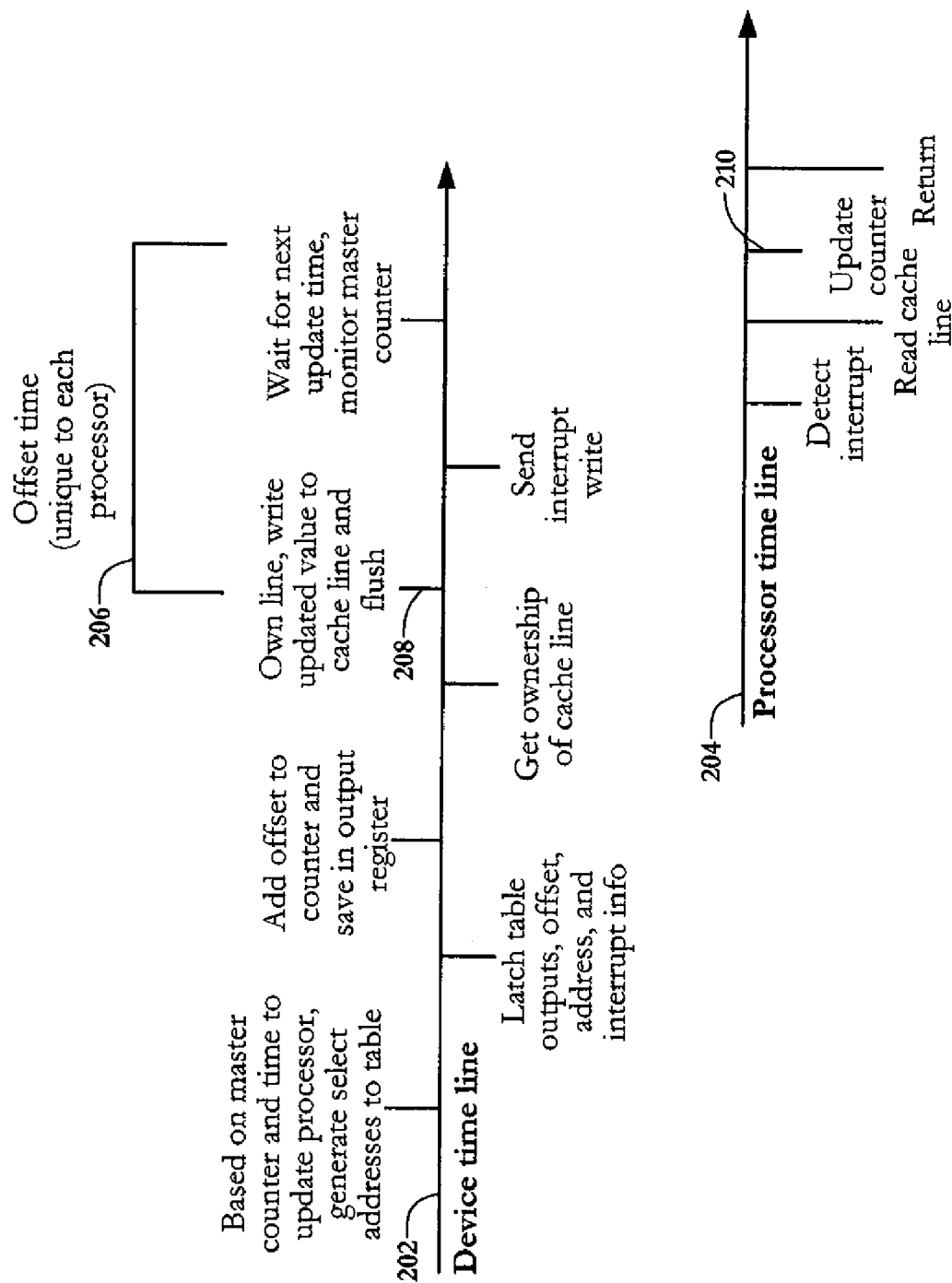
FIG. 2 is a timing diagram illustrating a timeline for processor counter updates according to an embodiment of the invention.

Example embodiments of the invention described herein may include separate offset registers to compensate for the different latencies/delays of each processor in processing counter updates (see FIG. 2). Controlling the update operation to one processor at a time avoids conflicts and the variations that can result. The example embodiments can be adapted for use of standard processor timer logic and can be implemented as external devices. Thus special system platform changes are not required to implement the improvements.

The measured drift between processors may alternatively determine the frequency of the update interrupts, or a constant update time may be used. Because there is only one action per processor per update period it is predicted that the effect on the system performance is very small. A summary of the actions for each processor by the proposed device (seen in FIG. 2) may be summarized as follows:
1) Select a target processor to update
2) Read an offset value from local memory (initialized by software) for the target processor
3) Read target memory address for local memory block to use from local memory
4) Read Interrupt address and data from local memory
5) Read master time value from local timer
6) Request ownership of cache line
7) Add the offset to timer value and save in register
8) Flush the updated cache line with new timer value
9) Issue processor interrupt request The interrupt is a high priority value executed as following by an interrupt handler:
1) Read local memory cache line
2) Cache line contains timer value data and a flag (see more details about the flag below)
3) Corrected timer value data is loaded into processor timer registers
4) Return to other processing The relative timing (not to scale) of these events can be seen in the timing diagram of FIG. 2. The timeline 202 represents operations of synchronization device (e.g., device 102 in FIG. 1) and timeline 204 represents operations of the processor (e.g., processor 104a in FIG. 1) receiving the update command by way of a processor interrupt. It will be appreciated that the sequence of timelines 202 and 204 is repeated for each processor in the system.

A computing system according to embodiments of the invention does not require a common clock and unique interface lines between processing nodes to synchronize processor timers. It will be appreciated that, without the use of a common clock, there is some probability of variation in processor timers due to system conflicts that occur during each update operation. An example of this variation is noted by bracket 206 in FIG. 2, where an update time between the writing 208 of the updated value to the cache and the updating 210 of the counter register may be different for each processor.

By using a local cache line for transferring the updated counter values to each processor, the variations such as indicated by bracket 206 can be minimized. Also, the path from the synchronizing device can be the same for the cache line flush to local memory and the interrupt write. As such, even when the updates are applied across multiple cells, the delays would be consistent. In recognition of this, when the local timer (e.g., timer 106) is read by software for use by the application, the code could alternatively add a constant equal to about the expected variation time to round up the value to the nearest microsecond and then mask off the least significant bits. The variation is expected to be much less than one-half microsecond in a typical system.

Figure 3:
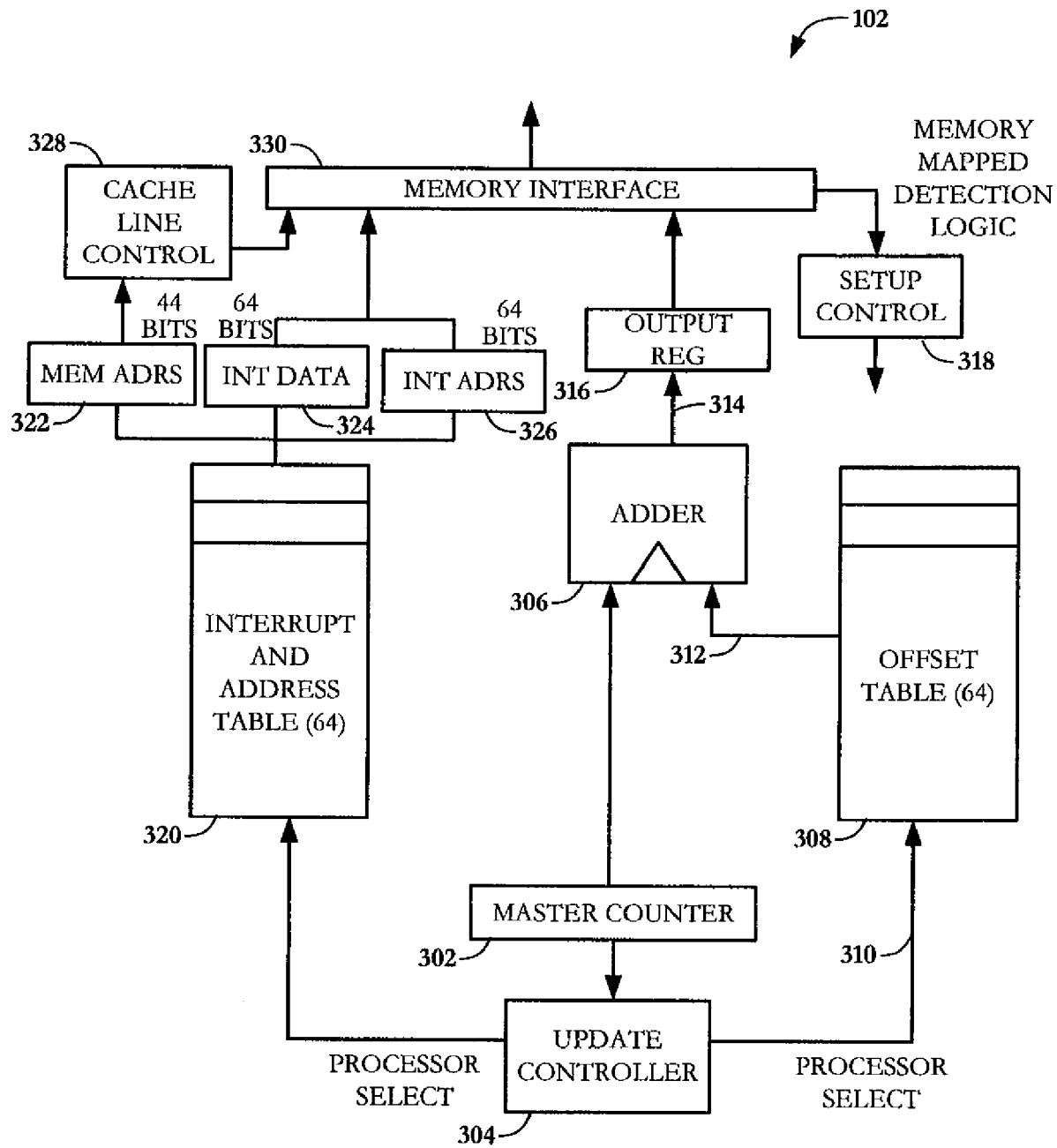
FIG. 3 is a block diagram illustrating an synchronizing device according to an embodiment of the invention.

In reference now to FIG. 3, a block diagram illustrates a synchronization device 102 according to an embodiment of the invention. The device 102 may be implemented as circuitry that is externally coupled to central processing unit (CPU) and motherboard chipsets (not shown). The synchronization device 102 includes a master counter 302 that contains the value to which all the processors will be referenced when updated. The counter 302 may include an interface 303 that facilitates synchronization with an external time source 305, and/or the device 102 may include a low drift oscillator source (not shown) for purposes of synchronizing the counter 302.

An update controller 304 is a logic circuit that contains the setup registers (not shown). These setup registers may indicate, among other things, how many processors are to be serviced, the time interval between update requests, and the flag used for passing up for timing adjustment testing. The update controller 304 uses the master counter 302 as the source for its update timing detection. It may be the master counter 302 that, either directly or via the update controller 304, initiates an update request sequence for a processor and thereby provides the processor select address to the tables 308, 320. It is expected that the update interval (e.g., the time between repeated counter updates of a particular processor) would be in the range of 10-102 milliseconds, and may vary between different processors on the same system.

An adder circuit 306 adds the current master counter value to an offset value determined for the selected processor from offset table 308, the latter holding the calculated offset value for each processor. The update controller 304 provides the address (or other processor identifier) to the offset table 308 as indicated by path 310, which causes the offset to be input to the adder 306 as indicated by path 312. In this example, the offset table 308 is 64 entries deep (configured for a system with 4 processing nodes×4 sockets×4 cores). The results of the adder 306 operations, as indicated by path 314, will be saved in an output register 316. The resulting adjusted value 314 from the adder 306 is loaded into the cache line for the update sequence as described in greater detail elsewhere hereinbelow.

The synchronization device 102 includes a setup control logic circuit 318 that controls the software update of the offset table 308 and the master counter 308. This update of the offset table 308 and/or master counter 302 may involve a register set that is memory mapped for ease of software update. During update, control signals may be sent to the update controller 304 to delay sync actions if setup write is in progress. An address can also be provided by the setup controller 318 for handling software writes of the value.

An interrupt and address table 320 contains the memory address of the cache line used for the sync data transfer, and the interrupt address and data for each processor. The interrupt address includes the processor destination and the interrupt data contains the interrupt vector value and other flags (like a PCI Message Signaled Interrupt (MSI) set of registers, as described in the PCI Local Bus Specification Revision 2.3 or latest). The interrupt value used is preferably a high priority value.

The interrupt data value provided by the table 320 may be the same for all processors, so it is possible to save table logic by using a single register if this is the case. There maybe other ways to save table space due to other common fields in the interrupt address, but this may be architecture-dependent. Registers 322, 324, and 326 respectively hold the cache line address, the interrupt write address, and the interrupt write data for the selected processor while they are being used during the update sequence.

A cache line control 328 includes logic for handling the fetch of a cache line for ownership and any coherency operations from the memory interface 330. The cache line control 328 schedules the flush write and the corresponding interrupt write operation on the memory interface 330.

The memory interface 330 includes interface logic for the path to the system memory. If the synchronization device 102 is Peripheral Component Interconnect (PCI) based, this interface 330 may be a PCI-x or PCI-e port. If the device 102 was part of an accelerator device on the Front Side Bus (FSB), the memory interface 330 may be a front side bus controller. The memory interface 330 supports access to memory and allows for the setup operations needed for initialization.

For a PCI interface, a standard memory-mapped block can be used for setup. For a FSB device that is not allowed to have memory mapped request sent to a processor, at least two configurations are possible. In one case, an internal processor in the device would address to a memory-mapped block for setup, and thus would be initialized by the local processor. In another scenario, the setup controller 318 would have some type of queue structure in memory that the software could load commands and generate operations, much like an intelligent PCI card. In particular discussions that follow, it may be assumed the device 102 can be accessed by a memory-mapped block.

As described above, the output register 316 holds the results of the addition of the offset to the counter value by the adder 302. The output register 316 may be included for timing reasons, but in some embodiments it may be possible to have the adder results go directly to the memory interface 322. This register 316 may be of a counter-type to allow for the final value to maintain its correspondence with the master counter 302 while waiting for delays due to obtaining cache line ownership or setup write delays. By choosing the register 316 as a counter-type register, the counter value will be adjusted to account for changes to the target processor clock before the counter value leaves the device 102.

In various embodiments, the device 102 is programmed with the local address for each processor along with the interrupt information contained in table 320. The access to the register set in the device 102 may be via a memory mapped block. The interrupt information 320 may include an address to which to write for the selected processor, and data such as the interrupt vector and flags. These may be fixed values based on the system configuration. The adjustment values in the offset table 308 may be loaded based on some combination of known system characteristics and additional characterization testing.

In order to accurately determine correct values for the offset table 308, several test periods may be initiated to complete the testing and obtain the final offset value for each processor. This characterization testing may be performed via the device 102 (e.g., programmed into the setup control 318 and/or the update controller 304) or some other processor. The testing may be performed at system initialization and/or repeated at some interval. To assist with the task of determining the offset value, a flag (e.g., flag 410 shown in FIG. 4) is added to the timer value data that is placed in the cache line of the processor. If the processor interrupt routine detects the adjust flag, it writes its timer registers to a second half of the cache line and stores it back. This is similar to an application reading the timer value and storing it in a record location. It is then possible for the testing software of the device 102 to compare the two values and load a new adjustment value in to the device offset register for that processor.

The testing procedure would then clear the flag in the cache lines of the processors after several time periods. All of the processors could receive update interrupts from the device and then could reset the flag to verify the results. One or two passes should result in a stable set of values. This characterization testing may obtain both an estimate of delay needed to write updates to a given processor counter, as well as a variance of each processor from the master counter 302, such as a measure of correctable error (e.g., drift) associated with each processor. In some cases, variables as bus speed, clock speeds, data transfer path, interrupt priority, etc., may be used to adequately determine a constant offset for a given system architecture. In other arrangements, these estimated offsets could be used with and/or adjusted by offsets measured during characterization testing.

It should be noted that the characterization testing as described above may also determine processor drift for each processor. For example, a test may involve synchronizing all processors to the master counter, and then measuring counter values repeatedly for some period of time without further updating the processor timers 106. In such a case, a variance y from the master counter 302 at a give time t for a particular processor may be expressed as $y=mt+b$, where m represents drift and b represents offset. Although the offset table 308 need not store any measure of processor drift (e.g., the master counter 302 is assumed to be a single accurate time source) such drift may be used to determine update intervals needed for a particular processor. For example, a processor with relatively low drift may need fewer updates (longer time intervals between updates) than processors with relatively higher drift.

Figure 4:
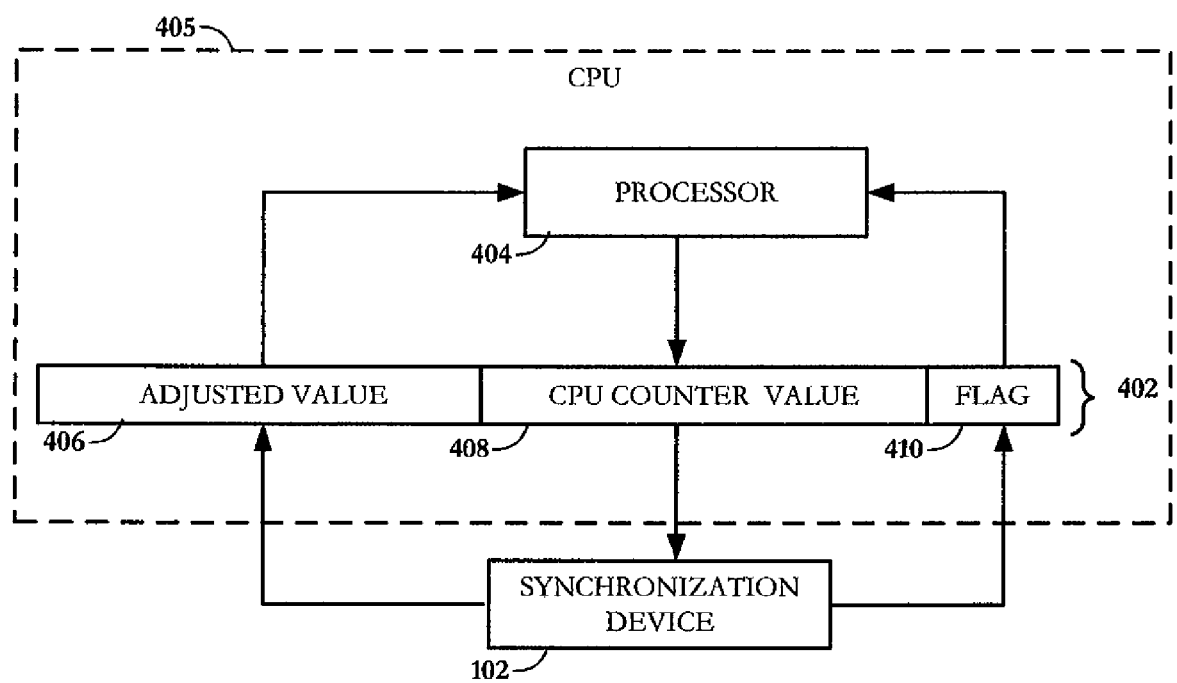
FIG. 4 is a block diagram illustrating a processor cache line according to an embodiment of the invention.

In FIG. 4, a block diagram shows a cache line 402 used to exchange clock synchronization data between a synchronization device 102 and a processor 404 during testing and update sequences. In many modern processors, the cache is included on the same chip as the logic circuitry 404 of a processor (e.g., CPU 104a). This is indicated in FIG. 4 by block 405 that represents a central processing unit (CPU) having the processing logic 405 and onboard cache 402. It will be appreciated that the CPU 405 may include multiple processing cores 404 that may have independent clock/counter registers.

There may be a unique cache line 402 reserved for each processor 404. This allows the cache line 404 to be in local memory to the processor 404 and thereby ease the adjustment operations. The illustrated cache line 402 is divided into three parts. One part 406 holds the adjusted value from the device for loading the processor counter. A second part 408 holds the counter value from the processor that is used during the adjustment setup period. The third part 410 holds the flag to tell the processor 404 which mode is in use, normal or adjust.

It will be appreciated that other variations on this arrangement of the cache line 402 are possible. For example, the adjusted value 406 and 408 may be stored in the same bit locations, and may be interpreted and acted upon differently based on the status indicated in the flag 402. Similarly, the flag 402 may be placed in a different location relative to the other values 406, 408, or may be incorporated into the values 406, 408 (e.g., replacing the least significant bit of one or both of the values 406, 408).

Figure 5:
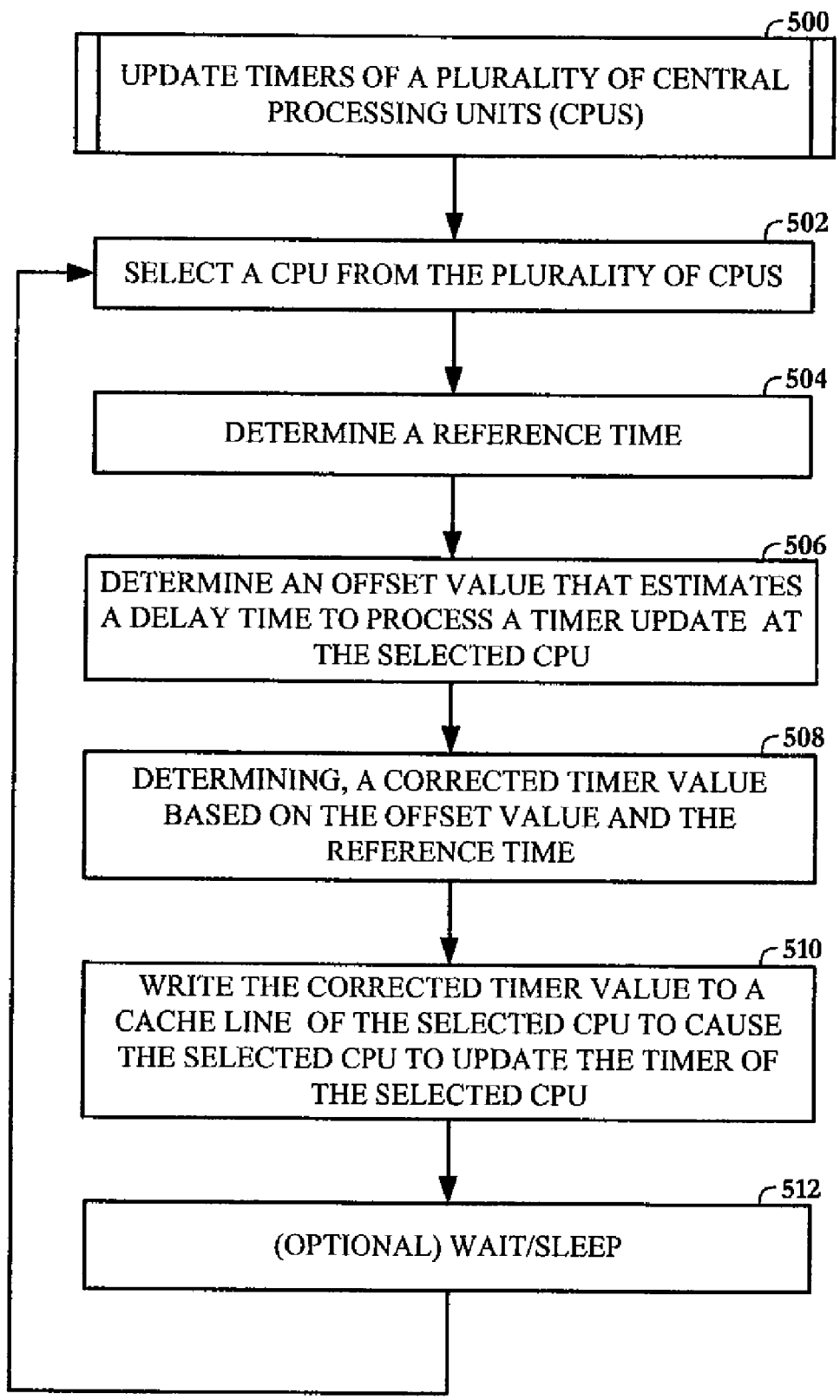
FIG. 5 is a flowcharts illustrating a procedure for updating processor timers according to an embodiment of the invention.

Referring now to FIG. 5, a flow chart illustrates an example procedure 500 utilized by a device to update timers/counters of a plurality of central processing units (CPUs) according to an embodiment of the invention. A CPU is selected 502 from the plurality of CPUs. The selection 502 may be based on a predetermined sequence or based on other factors. For example, based on testing characterization of the system, it may be determined that certain CPU counters exhibit greater errors than others, and therefore these CPUs may have the counters updated more frequently than the others. Thus the selection 502 may be statistically based on the amount of error determined by system characterization testing.

After a particular CPU is selected 502, a reference time is determined 504, such as may be output by a master counter 302 shown in FIG. 3. An offset value is also determined 506, such as by referencing an offset table 308 as shown in FIG. 3. A corrected timer value is then determined 508 based on the offset value and the reference time, such as via an adder 306 shown in FIG. 3. The corrected timer value is written 510 to a cache line of the selected CPU to cause the selected CPU to update its timer. The procedure 500 may include a wait state 512 in order to reduce consumption of system resources until the next update is needed.

As seen in the procedure, another CPU selection 502 is performed after the writing 510 of a corrected value and optional wait state 512. The procedure may continue as an loop of steps 502, 504, 506, 508, 510 and 512. It will be appreciated that many variations are possible on the illustrated procedure 500. For example, instead of an loop, the processor updates could be initiated by a local timer and device-local processor interrupt that causes a particular target processor to be updated at time intervals particular to that processor.

Figure 6:
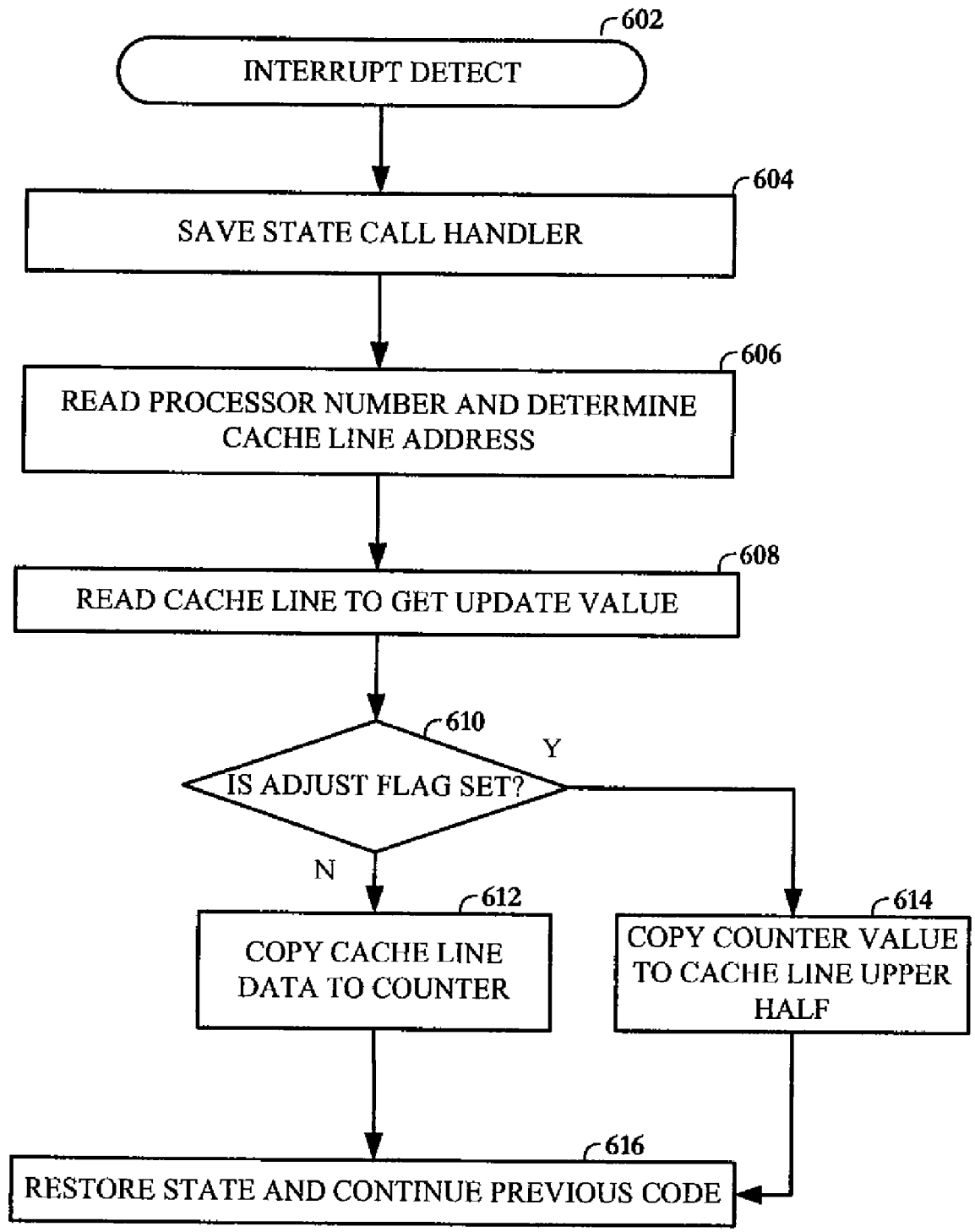
FIG. 6 is a flowchart illustrating a procedure for updating a processor timer in response to an interrupt according to embodiments of the invention.

In FIG. 6, a flow chart illustrates an example procedure utilized by a processor to adjust its counter according to an embodiment of the invention. The processor detects 602 an interrupt, and saves 604 its current state before servicing the interrupt. The processor determines 606 the appropriate cache line address and reads 608 the cache line to get the update value. The cache line may include a flag (e.g., flag 410 shown in FIG. 4) that is read and tested 610 to see whether the current mode is normal or adjust. If the adjust flag is set, then the processor's current counter value is copied 614 to the cache line (e.g., into portion 408 shown in FIG. 4), otherwise the processor copies 612 the cache line update data (e.g., from portion 406 in FIG. 4) to its own counter. Afterwards, the processor state is restored 616 and the previously executing code is continued.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims

What is claimed is:

1. A method comprising:
repeatedly performing, by a processor synchronization device coupled to a plurality of central processing units (CPUs), timing update operations that include:
selecting one of the plurality of CPUs;
determining a reference time;
utilizing an offset table indexed by processor identifiers to determine an offset value estimating a delay time to process a timer update at the selected CPU;
causing the plurality of CPUs to write current counter values to the respective cache lines of the CPUs;
determining the values of the offset table by comparing the current counter values to the reference time;
determining a corrected timer value of the selected CPU based on the offset value and the reference time;
writing the corrected timer value to a cache line of the selected CPU; and
causing the selected CPU to update the timer of the selected CPU based on the corrected timer value written to the cache line.

2. The method of claim 1, wherein the offset value comprises a time required to write the corrected timer value to the cache line of the selected CPU and a CPU processing time to update the timer of the selected CPU.

3. The method of claim 1, wherein causing the selected CPU to update the timer of the selected CPU comprises sending an interrupt to the selected CPU, wherein an interrupt handler of the selected CPU causes the selected CPU to update the timer of the selected CPU based on the corrected timer value of the cache line.

4. The method of claim 1, further comprising determining update time intervals that are unique to each of the plurality of CPUs, and wherein the one of the plurality of CPUs is selected based on the update time interval associated with the selected CPU.

5. The method of claim 1, further comprising storing the corrected timer value in a register of the synchronization device, wherein the register modifies the corrected timer value to maintain correspondence with the reference time to account for delays in writing the corrected timer value to the cache line of the selected CPU.

6. An apparatus, comprising:
a memory interface capable of communicating with a plurality of central processing units (CPUs) via at least one memory bus;
an offset table comprising a plurality of offset values that each estimate a delay time to process a timer update at respective ones of the central processing units;
a master counter that determines a reference time;
an update controller logic circuit coupled to the offset table and the master counter, wherein the update controller performs update operations that include:
determining corrected timer values for the central processing units based on the reference time and the offset values;
writing, via the memory interface, the corrected timer values to cache lines of the respective central processing units; and
causing the central processing units to update their timers based on the corrected timer values written to the cache lines.

7. The apparatus according to claim 6, and further comprising a setup controller that performs setup operations comprising:
causing the plurality of central processing units to write current counter values to the respective cache lines of the central processing units; and
determining the values of the offset table by comparing the current counter values to the reference time.

8. The apparatus according to claim 6, wherein the offset values comprise times required to write the corrected timer value to the respective cache lines of the central processing units and central processing unit processing times to update the respective timers of the central processing units.

9. The apparatus according to claim 6, and further comprising an interrupt/address table coupled to the update controller and the memory interface, the interrupt/address table comprising addresses and associated interrupt vectors for each of the central processing units, and wherein causing the central processing units to update their timers comprises sending interrupts to the respective central processing units via the interrupt/address table, and wherein interrupt handlers of the respective central processing units cause the respective central processing units to update their timers in response to the interrupts.

10. The apparatus according to claim 9, wherein the interrupt/address table and the offset table are indexed by a processor identifier, and wherein the update operations are initiated by the update controller sending a processor select signal to the interrupt/address table and the offset table.

11. The apparatus according to claim 6, wherein the update operations further comprise determining update time intervals unique to each of the plurality of CPUs, and wherein a selected one of the plurality of CPUs is selected based on the update time interval associated with the selected CPU.

12. The apparatus according to claim 6, further comprising an adder coupled to the master counter, the offset table, and the memory interface, wherein the adder determines the corrected timer values by summing the reference time and the offset values, and wherein the adder writes the corrected timer values to the memory interface in response to the summing operation.

13. The apparatus according to claim 12, further comprising a counter-type register that couples the adder to the memory interface, wherein the counter type register causes the corrected timer values to maintain correspondence with the master counter to account for delays in writing the corrected timer values via the memory interface.

14. The apparatus according to claim 6, wherein the memory interface comprises a peripheral input-output interface.

15. The apparatus according to claim 6, wherein the memory interface comprises a front-side bus interface.

16. The apparatus of claim 6, wherein the master counter comprises an interface to an external reference time source, and wherein the master counter is updated by the external reference time source.

17. An apparatus, comprising:
means for interfacing with a plurality of central processing units;
means for determining corrected timer values for each of the central processing units as a function of predetermined values indexed by processor identifiers;
means for causing the plurality of central processing units to write current counter values to the respective cache lines of the central processing units; and
means for determining offset values of each of the central processing units based on the current counter values, wherein each of the offset values estimate a delay time to update counters of respective ones of the central processing units;
means for writing the corrected timer values to cache lines of the respective central processing units; and
means for causing the central processing units to update their timers based on the corrected timer values written to the cache lines.

18. The apparatus of claim 17, further comprising
means for causing the plurality of central processing units to write current counter values to the respective cache lines of the central processing units; and
means for determining offset values of each of the central processing units based on the current counter values, wherein each of the offset values estimate a delay time to update counters of respective ones of the central processing units.

19. The apparatus of claim 17, further comprising
means for causing the corrected timer values to maintain correspondence with a master counter reference time before the corrected timer values are written to the cache lines to account for delays in writing the corrected timer values to the cache lines.

* * * * *